Feb. 6, 1934.  S. A. GUDGEON ET AL  1,945,606
FLUID BRAKE
Filed Aug. 5, 1932  4 Sheets-Sheet 1

INVENTORS.
Stephen A. Gudgeon &
BY James B. Wemmer
Nathan Comstock
ATTORNEY

Feb. 6, 1934.  S. A. GUDGEON ET AL  1,945,606
FLUID BRAKE
Filed Aug. 5, 1932  4 Sheets-Sheet 2

INVENTORS.
Stephen A. Gudgeon &
BY James B. Wemmer.
Nathan Comstock.
ATTORNEY.

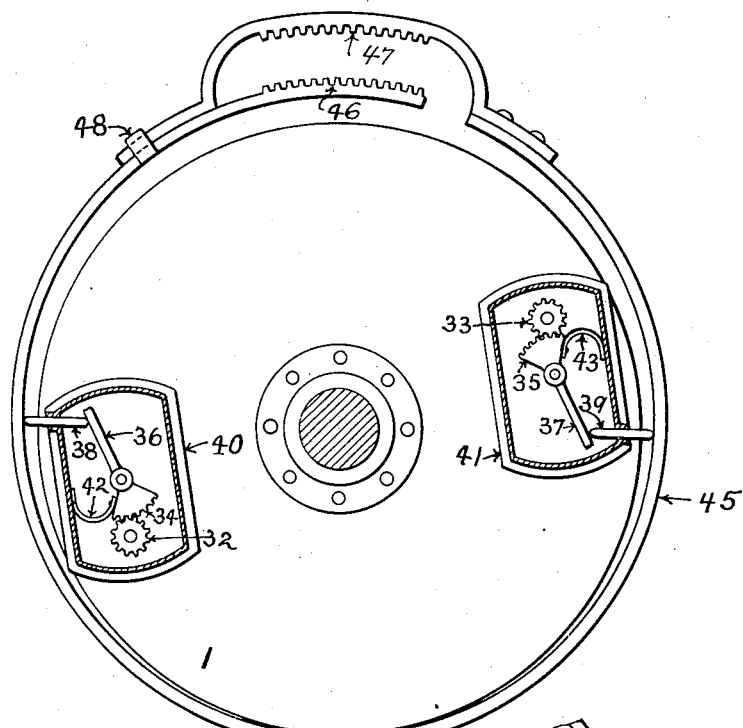
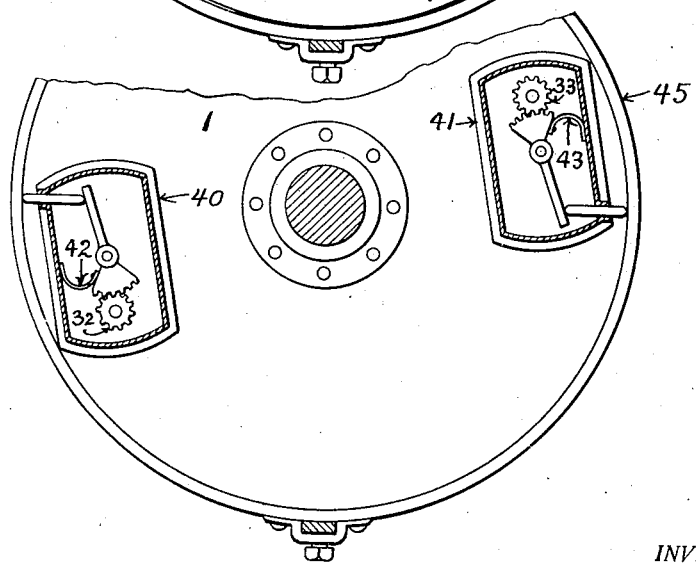

Feb. 6, 1934.  S. A. GUDGEON ET AL  1,945,606
FLUID BRAKE
Filed Aug. 5, 1932   4 Sheets-Sheet 4

INVENTORS.
Stephen A. Gudgeon &
BY James B. Wemmer
Nathan Comstock
ATTORNEY.

Patented Feb. 6, 1934

1,945,606

UNITED STATES PATENT OFFICE 1,945,606

FLUID BRAKE

Stephen A. Gudgeon and James B. Wemmer,
La Farge, Wis.

Application August 5, 1932. Serial No. 627,552

15 Claims. (Cl. 188—90)

Our invention relates to fluid brakes in which the braking action is effected by the restriction or shutting off of the flow of a fluid through a passage; and the objects of our invention are; first, to provide a brake mechanism which is easily operated and through which any desired degree of action may be had from a slight retardation of the relatively moving parts to a positive locking of them against relative movement; second, to provide a brake that may be readily applied to any relatively moving parts having a rotary motion; third, to prevent the escape of fluid from the brake mechanism; fourth, to provide improved means for operating the brake; fifth, to provide a fluid brake which may be readily assembled; and sixth, to provide an improved brake of the rotary piston type.

Figure 1:
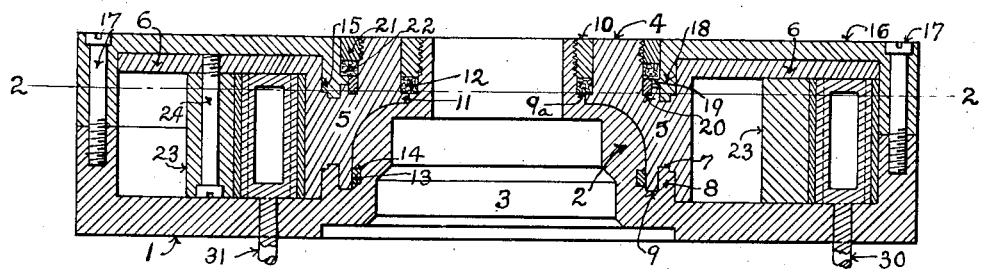
Figure 2:
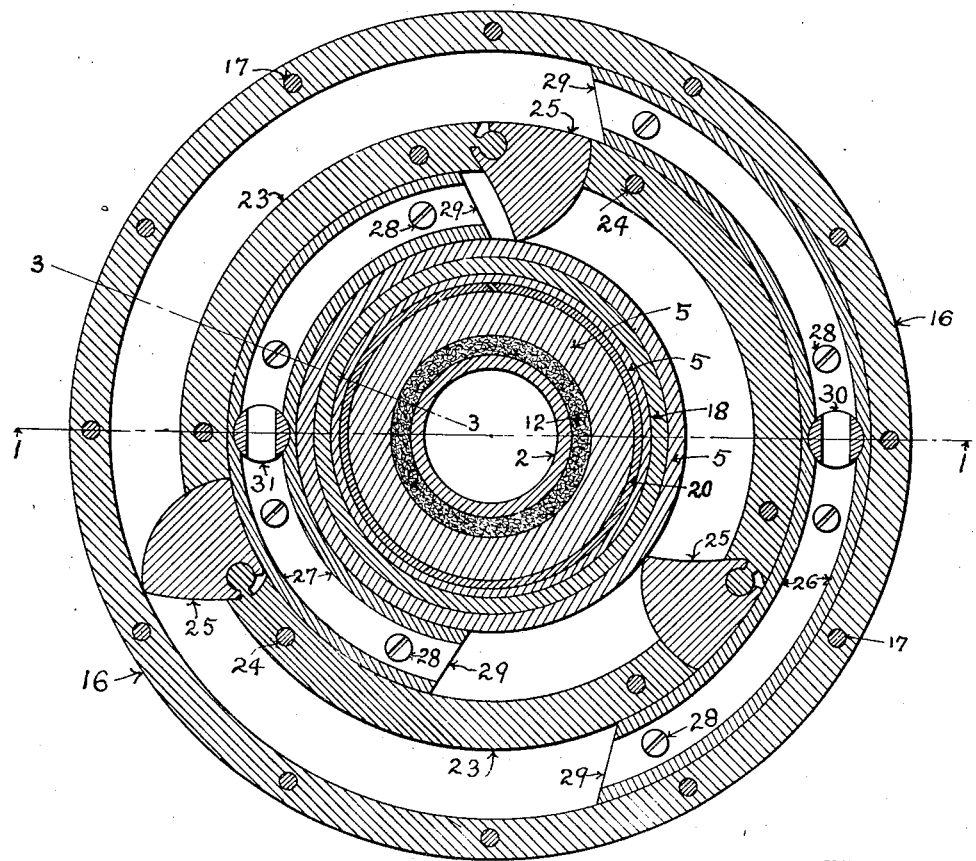
Figure 3:
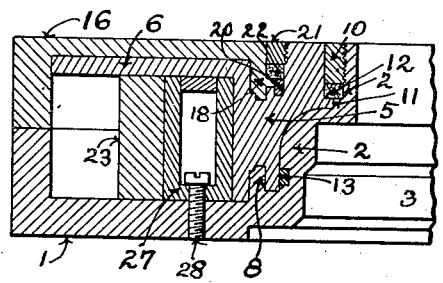
Figure 4:
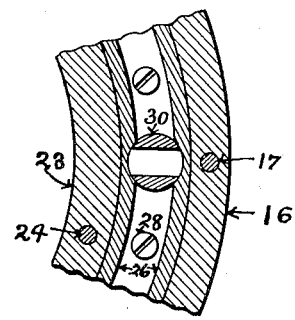
Figure 5:
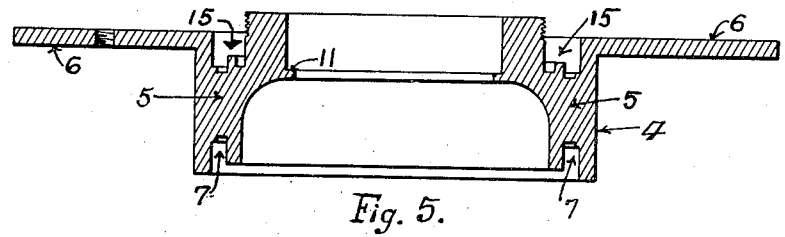
Figure 6:
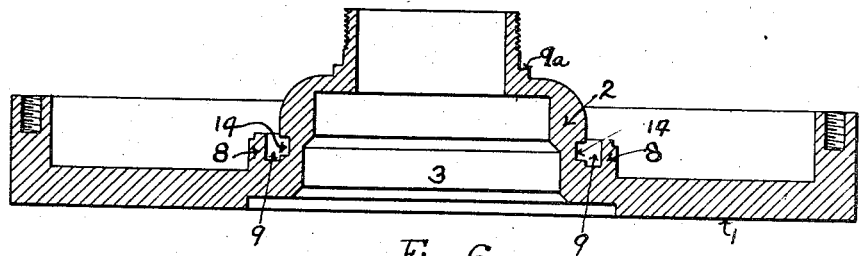
Figure 7:
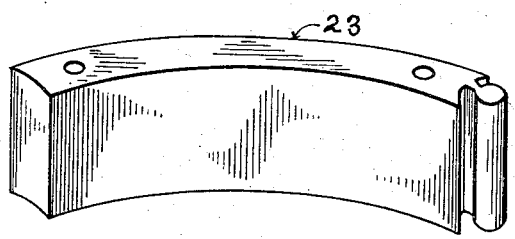
Figure 8:
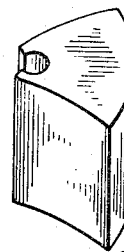
Figure 11:
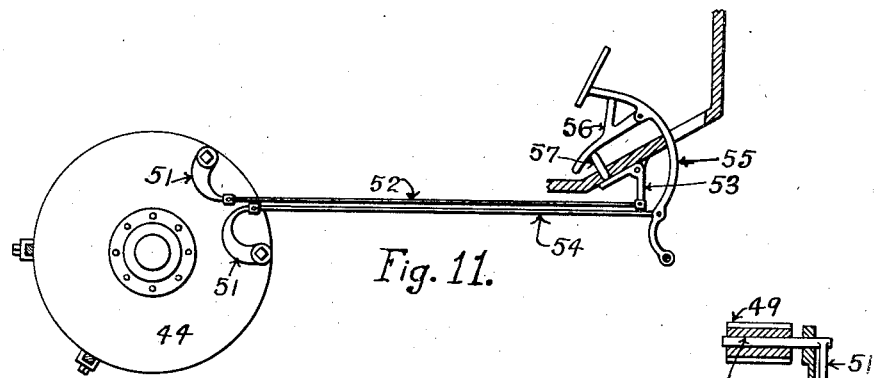
Figure 12:
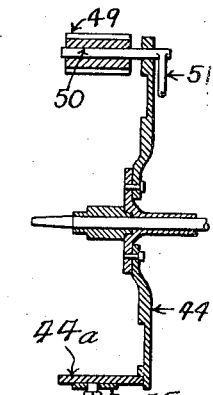
Figure 13:
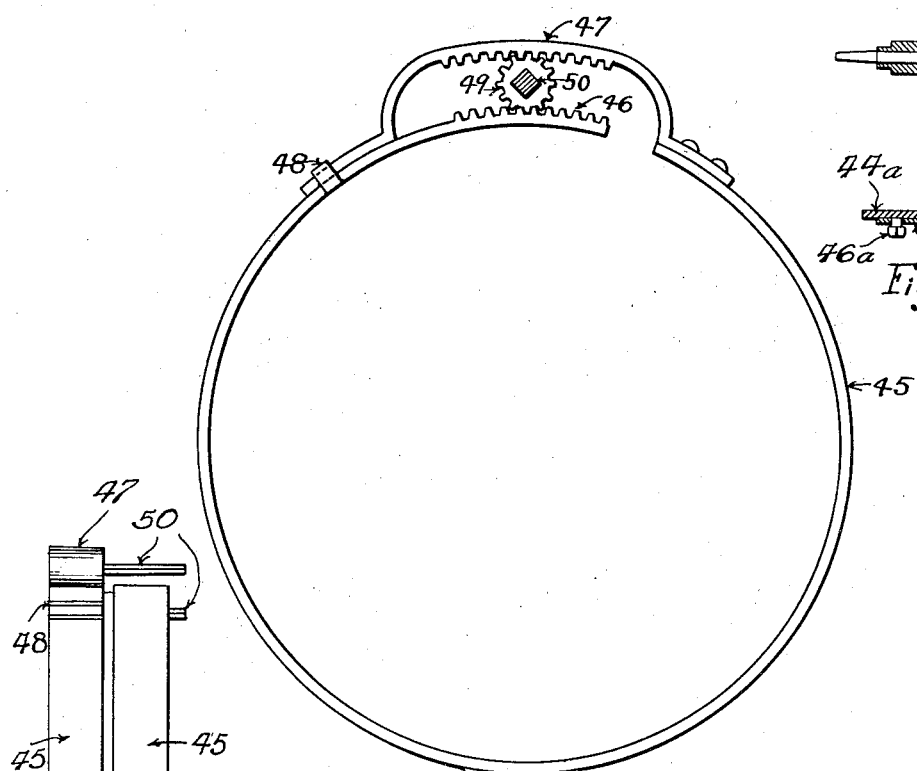
Figure 14:
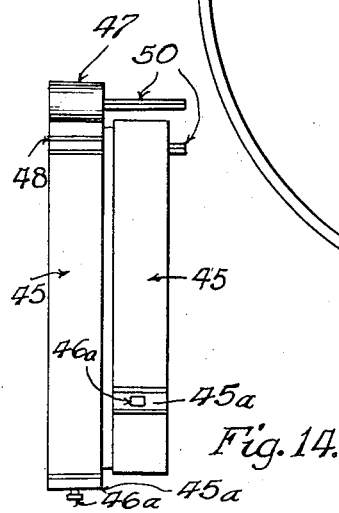

We attain these objects and other objects and advantages hereinafter appearing by the mechanism illustrated in the accompanying drawings, in which:—Figure 1 is a section of the brake drum taken on the line 1—1 of Fig. 2, the housings and gears being omitted; Fig. 2 is a section of the brake drum taken on the line 2—2 of Fig. 1; Fig. 3 is a broken section taken on the line 3—3 of Fig. 2; Fig. 4 is a fragmentary section of a portion of the drum showing a valve in closed position; Fig. 5 is a sectional elevation of the rotor; Fig. 6 is a sectional elevation of a part of the drum or casing; Fig. 7 is a perspective of a segment of the ring which is secured to the rotor; Fig. 8 is a perspective of one of the pistons or vanes; Fig. 9 is an elevation of the drum and the band for operating the valves, partly in section to show the operating mechanism for the valves; Fig. 10 is a fragmentary elevation of the drum and the band for operating the valves showing the valves in a different position; Fig. 11 is a side elevation of the anchor plate and mechanism for operating the bands, parts being shown in section; Fig. 12 is a sectional elevation of the anchor plate and one of the band operating pinions; Fig. 13, is a side elevation of the bands showing the rack and pinion operating mechanism, and Fig. 14 is a side elevation of the structure shown in Fig. 13.

Similar numerals refer to similar parts throughout the several views.

The brake drum or casing is formed of a cylindrical shell 1, having a boss or hub 2 extending inwardly at its center. This boss or hub is open at the center and forms a stepped journal bearing 3, whereby the drum is rotatably mounted.

Rotatably mounted upon the boss or hub 2, is a rotor 4, which comprises a hub 5, provided with an annular plate 6. The hub 5 is provided with a stepped annular recess 7, which fits over a corresponding stepped annular flange 8, of the hub 2. The inner wall of the recess 7, fitting within the annular recess 9, formed between the body of the hub and the flange 8, and the outer wall of the recess 7 fitting against and bearing upon the outer side of the flange 8 and the wall of the shell 1. The inner end of the hub 2 is cut away to form a shoulder 9a, and is screw threaded to receive a packing ring 10. The inner wall of the hub 5 of the rotor is cut away to form an annular shoulder 11, which bears against the hub 2. The shoulders 9a and 11 form the bottom of an annular recess between the rotor 4 and the hub 2, within which is placed suitable packing 12 which is confined within the recess by the ring 10 secured to the hub 2 and bearing against the wall of the rotor. A spring ring 13 is seated in a recess 14 in the hub 2, and bears against the rotor 4.

The rotor 4 is provided with a stepped annular recess 15. A shell 16 is secured to the shell 1 by screw bolts 17 and is provided with an inwardly projecting stepped annular flange 18, which fits within and bears against a side and the bottom wall of the recess 15, and rotatably confines the rotor 4 between the shells 1 and 16, which form the drum or casing. The inner wall of the flange 18 is cut away to form a shoulder 19, and a spring ring 20 seated within the rotor 4, at the inner edge of the recess 15 bears against the shoulder 19. A packing ring 21 is screw-threadedly secured to the rotor 4 and bears against the inner wall of the flange 18 and confines the packing 22 upon the shoulder 19 and spring ring 20 and between the flange 18 and the rotor 4. This arrangement of stepped recesses, and annular rings, and the spring rings and packings serve to permit a free rotation of the rotor within the drum and prevent any escape of fluid between the shells and rotor.

A segmental ring 23 is secured to the annular plate 6 of the rotor 4 by the screw bolts 24, and bears against the shell 1, and divides the annular chamber formed by the shells 1 and 16 and the outer wall of the hub 5 of the rotor into two annular chambers of equal width. A piston or vane 25 is pivotally secured to each segment of the ring at one end and abuts and fits against the end of the adjoining segment, and is adapted to swing into and completely close either of the chambers formed by the ring. The outer sides of the pistons 25 are curved to conform with the outer periphery of the ring 23, and fit tightly against the inner wall of an outer channel member 26, and the inner sides of the pistons 25 are curved to conform with the inner periphery of the ring 23, and fit tightly against the outer wall of the inner channel member 27.

These segmental box-like channel members 26 and 27 are secured to the shell 1, by the screws 28, and completely fill the annular chambers formed by the ring 23 and the outer walls of the shells 1 and 16 and the inner wall of the hub 5 of the rotor, and are placed on opposite sides of their chambers and extend longitudinally of them through nearly one half of their circumferences, the ends of the channels being only a sufficient distance apart to permit the pistons to swing freely between them from one chamber to the other. The ends 29 of the channels are inclined as shown in Fig. 2 of the drawings, so that the contact of the pistons or vanes 25 therewith, will cause them to be shifted on their pivots from one chamber to the other irrespective of the direction of rotation of the rotor. The channels 26 and 27 each form a restriction of the chamber in which it is located.

Rotary valves 30 and 31 adapted to restrict or entirely close the channel openings are located in the channels 26 and 27 respectively. The stems of these valves extend through the shell 1, and pinions 32 and 33 are secured to the stems for operating the valves. Gear segments 34 and 35 are pivoted to the shell 1, and mesh with the pinions 32 and 33. These gear segments 34 and 35 are provided with tail pieces 36 and 37 extending outwardly from the pivots, which are engaged by push pins 38 and 39 extending through the housings 40 and 41 on the shell 1. Springs 42 and 43 within the housings bear against the segments and normally hold the valves in open position and the push pins in actuating position with their outer ends extending beyond the periphery of the drum.

A fixedly secured anchor plate 44, mounted adjacent the drum carries brake bands 45, of the form shown in Fig. 13 of the drawings. The bands are held against rotation by the conventional arm 44a secured to the plate 44, and fitting within the sockets 45a upon the bands, and secured therein by the set screws 46a. One end of each band is formed with a rack 46, and to the other end of the band one end of a concentric rack 47 is secured. The other end of the rack 47 fits and slides upon the band 45, and is slidably held thereon by the loop 48. Pinions 49 mounted upon shafts 50 rotatably mounted in the anchor plate 44 engage the racks 46 and 47 to close and open the brake bands. Obviously these concentric racks with the pinion and loop may be applied to an expanding as well as to contracting brake band. One of the bands 45 engages the push pins 38 and 39 to actuate the valves 30 and 31, and the other band grips and holds the drum against rotation. Arms 51 are secured to the shafts 50. The arm 51 upon the shaft 50 which operates the band that engages the push pins 38 and 39 is connected by a rod 52 to the pivoted elbow lever 53. A rod 54 connects the other arm 51 with the pivoted foot lever 55. Pivoted to the lever 55 is a drag lever 56 which engages a push pin 57 bearing upon the free arm of the elbow lever 53.

In operation the brake drum, which is free to rotate as upon the axle of an automobile, is filled with oil or other suitable fluid, and may be rotated by the action of the rotor which is fixedly secured to a rotating object such as a wheel. If now the foot lever is actuated the drum will be seized and held against rotation by one brake band and the rotation of the rotor will cause the pistons or vanes to move through the chambers and force the fluid in them through the channels 26 and 27 in the direction of rotation. As these channels are smaller in cross-section than the chambers, they restrict or retard the flow of fluid in front of the pistons thus causing a braking action upon the rotor and wheel. If further braking action is desired the drag lever 56 is actuated to close the other band upon the push pins and turn the valves to produce such restriction or closing of the channels, as may be necessary to produce the desired braking or locking effect.

The construction shown and described may be variously modified in the matter of details, or to adapt it for a particular purpose without departing from the spirit of our invention, which is not to be considered as limited to the specific structures shown and described but only by the state of the art.

We claim:

1. In a fluid brake, a casing, a rotor rotatably mounted in the casing provided with means dividing the casing into concentric annular chambers, means in the outer chamber providing a restricted passage therein, means in the inner chamber providing a restricted passage therein opposite the passage in the outer chamber; and means on the rotor for forcing fluid through said passages.

2. In a fluid brake, a casing, a rotor rotatably mounted in the casing provided with means dividing the casing into concentric annular chambers, means in the outer chamber providing a restricted passage therein, means in the inner chamber providing a restricted passage therein opposite the passage in the outer chamber, means on the rotor for forcing fluid through the passages, and means whereby the passages may be further restricted or closed.

3. In a fluid brake, a casing, a rotor rotatably mounted therein, the casing and rotor formed into two concentric annular chambers provided with opposed restricted portions, and means on the rotor for forcing fluid through said restrictions.

4. In a fluid brake, a rotatable casing, a rotor rotatably mounted in the casing provided with means dividing the casing into concentric annular chambers, means in the outer chamber providing a restricted passage therein, means in the inner chamber providing a restricted passage therein opposite the passage in the outer chamber, means on the rotor for forcing fluid through the passages, and means for holding the casing against rotation.

5. In a fluid brake, a rotatable casing, a rotor rotatably mounted in the casing provided with means dividing the casing into concentric annular chambers, means in the outer chamber providing a restricted passage therein, means in the inner chamber providing a restricted passage therein opposite the passage in the outer chamber, means on the rotor for forcing fluid through said passages, means whereby said passages may be further restricted or closed, and means for holding said casing against rotation.

6. In a fluid brake, a rotatable casing, a rotor rotatably mounted therein, the casing and rotor formed into two concentric annular chambers provided with opposed restricted portions, means on the rotor for forcing fluid through said restrictions, and means for holding the casing against rotation.

7. In a fluid brake, a rotatable casing, a rotor rotatably mounted therein, the casing and rotor forming two concentric annular chambers provided with opposed restricted portions, means on the rotor for forcing fluid through said restrictions, means whereby said restrictions may be further restricted or closed, and means for holding the casing against rotation.

8. In a fluid brake, a rotatable casing, a rotor rotatably mounted in the casing, a segmental ring secured to the rotor dividing the casing into concentric annular chambers, pistons in said ring pivoted thereto and adapted to swing into and close either chamber formed by the ring, an annular channel member secured and fitting within the outer chamber and extending through nearly one half of its circumference and provided with inclined ends, an annular channel secured and fitting within the inner chamber opposite the channel member in the outer chamber and provided with inclined ends, whereby on rotation of the rotor the pistons on contact with the ends of the channels will be swung from one chamber to the other.

9. In a fluid brake, a rotatable casing, a rotor rotatably mounted therein, the casing and rotor forming two concentric annular chambers provided with opposed restricted portions, pistons pivoted on the rotor for forcing fluid through the restrictions, and means whereby the pistons are swung from one chamber to the other.

10. In a fluid brake, a rotatable casing, a rotor rotatably mounted therein, the casing and rotor forming two concentric annular chambers provided with opposed restricted portions, pistons on the rotor for forcing fluid through the restrictions, means whereby the pistons are shifted from one chamber to the other, means for further restricting or closing the restricted portions of said chambers, means for actuating said last mentioned means, means for holding the casing against rotation, and means whereby the holding means and actuating means may be operated successively.

11. In a fluid brake, a rotatable casing, a rotor rotatably mounted in the casing, a segmental ring secured to the rotor dividing the casing into concentric annular chambers, pistons in said ring pivoted thereto and adapted to swing into either chamber formed by the ring, an annular channel member secured and fitting within the outer chamber and extending through nearly half its circumference and provided with inclined ends, an annular channel member secured and fitting within the inner chamber opposite the channel member in the outer chamber and provided with inclined ends, and extending through nearly half the circumference of the inner chamber, whereby on rotation of the rotor the pistons on contact with the ends of the channels will swing from one chamber to the other, valves in said channel members for further restricting or closing them, means for operating said valves, means for holding the casing against rotation, and means whereby the holding and operating means may be actuated serially.

12. In a fluid brake, a cylindrical shell member with an inwardly extending hub having a central journal bearing, a rotor rotatably mounted on the hub, the rotor and hub being provided with interfitting stepped annular rings and recesses, a spring ring seated in the hub and bearing against the rotor, an annular shoulder upon the inner wall of the rotor bearing against the hub, a shoulder upon the hub adjacent thereto, packing resting upon the shoulders of the hub and rotor, a packing ring secured to the hub and bearing against the rotor for confining the packing between it and the hub, a second cylindrical shell member secured to said first shell member, said second shell member provided with an inwardly projecting stepped annular flange with an inwardly projecting annular shoulder on its inner wall, the rotor provided with a stepped annular recess having its outer and bottom walls adapted to fit said flange and annular shoulder, a spring ring seated in said recess and bearing against the inner wall of the annular shoulder, and a packing ring secured to the rotor and bearing against the inner wall of the flange.

13. In a fluid brake, a rotatable casing, a rotor rotatably mounted therein, the casing and rotor forming two concentric annular chambers provided with opposed restricted portions, pistons on the rotor for forcing fluid through the restrictions, means whereby the pistons are shifted from one chamber to the other, means for further restricting or closing the restricted portions of said chambers, means for actuating said last mentioned means, and means for holding the casing against rotation.

14. In a fluid brake, a rotatable casing, a rotor rotatably mounted therein, the casing and rotor forming two concentric annular chambers provided with opposed restricted portions, pistons on the rotor for forcing fluid through the restrictions, means whereby the pistons are shifted from one chamber to the other, valves for further restricting or closing the restricted portions of said chambers, stems on said valves extending outside the casing, gears on said stems for operating the valves, pivoted gear segments provided with tail pieces engaging said gears, push pins engaging said tail pieces, springs engaging the gear segments for holding the valves open, a fixed anchor plate, bands carried by said anchor plate and surrounding the casing, one end of each band provided with a rack the other end of each band having a rack concentric with said first rack secured thereto, means slidably securing the other end of the concentric rack to the band, gears interposed between said racks, shafts on said anchor plate for operating said gears, arms secured to said shafts, a foot lever connected with one of said arms to close one of the bands to hold the casing against rotation, an elbow lever connected to the other arm, a push pin adapted to engage said lever to operate the arm, a lever pivoted to the foot lever to engage said push pin to close the band against the push pins on the casing to operate the valves.

15. In a fluid brake, a casing, a rotor rotatably mounted therein, the casing and rotor forming two concentric annular chambers, pistons on the rotor adapted to traverse either chamber, and means whereby the pistons may shift from one chamber to the other.

STEPHEN A. GUDGEON.
JAMES B. WEMMER.